(12) United States Patent
Wege et al.

(10) Patent No.: US 6,365,694 B1
(45) Date of Patent: Apr. 2, 2002

(54) AMORPHOUS VINYL CYCLOHEXANE POLYMERS

(75) Inventors: Volker Wege, Krefeld; Ralf Dujardin, Willich; Yun Chen, Krefeld; Johann Rechner, Kempen; Friedrich-Karl Bruder, Krefeld, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/581,125

(22) PCT Filed: Dec. 8, 1998

(86) PCT No.: PCT/EP98/07977

§ 371 Date: Aug. 8, 2000

§ 102(e) Date: Aug. 8, 2000

(87) PCT Pub. No.: WO99/32528

PCT Pub. Date: Jul. 1, 1999

(30) Foreign Application Priority Data

Dec. 18, 1997 (DE) .......................... 197 56 368

(51) Int. Cl.⁷ .......................... C08F 32/02; C08F 32/08
(52) U.S. Cl. .................. 526/309; 526/283; 526/308; 526/319; 526/328; 526/335; 526/339; 526/340.2; 526/340.3
(58) Field of Search ................ 526/308, 309, 526/335, 340.2, 340.3

(56) References Cited

U.S. PATENT DOCUMENTS

| | | | |
|---|---|---|---|
| 4,997,898 A | * 3/1991 | Ishihara | ...................... 526/308 |
| 5,178,926 A | 1/1993 | Tanaka et al. | ................. 428/64 |
| 5,352,744 A | 10/1994 | Bates et al. | ................. 525/339 |
| 5,612,422 A | 3/1997 | Hucul et al. | ................. 525/338 |
| 5,654,253 A | 8/1997 | Hucul et al. | ................. 502/240 |
| 5,700,878 A | 12/1997 | Hucul et al. | ............. 525/333.3 |
| 5,977,271 A | * 11/1999 | McKay | ....................... 526/170 |
| 5,986,021 A | 11/1999 | Hokkanen et al. | ............. 526/64 |

FOREIGN PATENT DOCUMENTS

| | | |
|---|---|---|
| EP | 0 423 100 | 4/1991 |
| GB | 933596 | 8/1963 |
| JP | 3-76706 | 4/1991 |
| WO | 96/34896 | 11/1996 |

OTHER PUBLICATIONS

J. Polym. Sci., Part A, vol. 2, 1964, p. 4165–4168, Refractive Index and Composition of Poly(methyl Methacrylate) Fracture Surface Layers, Roger P. Kambour.

* cited by examiner

Primary Examiner—Fred Zitomer
(74) Attorney, Agent, or Firm—Joseph C. Gil; Aron Preis; James R. Franks

(57) ABSTRACT

Amorphous polymers, including homopolymers and co-polymers, containing residues of vinyl cyclohexane and/or substituted vinyl cyclohexane are described. The polymers of the present invention have a syndiotactic configuration in which the quantity of diads is greater than 50.1% and less than 74%. The polymers of the invention have high transparency, low birefringence and high heat defection temperature, and can be used to prepare molded articles (e.g., optical data storage media and lenses) and films.

10 Claims, No Drawings

AMORPHOUS VINYL CYCLOHEXANE POLYMERS

The present invention relates to polymers and co-polymers based on vinyl cyclohexane (VCH) with predominantly syndiotactic configuration and a process for their manufacture and their use as optical material. The materials may be processed into moulded bodies by extrusion or injection moulding and are particularly suitable as substrate for optical data storage media such as compact discs, video discs, re-writable optical discs.

Transparent plastics such as aromatic polycarbonate, polymethyl methacrylate or polystyrene may be used as substrate for optical data storage media. Addition co-polymers comprising ethylene and a norbornene derivative or a tetracyclododecene derivative and hydrogenated products of ring-opened metathesis polymers comprising norbornene or tetracyclododecene are also considered.

None of the current substrate materials may, however, be used without restriction for very high data storage densities (>5, particularly >10 Gbytes related to a disc of 120 mm diameter). Very low birefringence and water absorption, high heat deflection temperature, accompanied by adequate mechanical properties and low melting viscosity, are simultaneously required for this purpose.

Although aromatic polycarbonates have very good mechanical properties and heat deflection temperature, their birefringence and water absorption are too high.

The birefringence of polystyrene is too high and its heat deflection temperature too low.

The water absorption of polymethyl methacrylate is too high and its dimensional stability too low. The birefringence of addition co-polymers comprising ethylene and a nonpolar norbornene or tetracyclododecene is low and they have virtually no water absorption.

These materials are very expensive to produce, however. The materials may only be produced in optically pure quality with great difficulty. The presence of gel contents also reduces their applications as optical materials. Considerable technical outlay is involved in separating the catalysts and co-catalysts.

Optical materials comprising a hydrogenation product of a polymer comprising an alkenyl-aromatic hydrocarbon compound or a co-polymer thereof are described in GB 933,596 (=DE-AS 1 131 885), EP-A 317 263, U.S. Pat. Nos. 4,911,966 and 5,178,926. There is no reference to the configuration.

Hermann Staudinger was the first to describe the hydrogenation of polystyrene in 1929. More recent patent literature concerns the basic micro-structure of polyvinyl cyclohexane and/or hydrogenated polystyrene. The prior art is that amorphous vinyl cyclohexane polymers have an atactic configuration and crystalline VCH (vinyl cyclohexane) polymers either isotactic or syndiotactic configuration (EP-A 0 322 731, EP-A 0 423 100, U.S. Pat. Nos. 5,654,253; 5,612,422; WO 96/34896). Isotactic PVCH (polyvinyl cyclohexane) is produced in the presence of Ziegler catalysts and has a high melting point (J. Polym. Sci., A2, 5029 (1964). EP-A 0 322 731 describes that vinyl cyclohexane polymers with syndiotactic configuration by hydrogenation of syndiotactic polystyrene are crystalline, wherein the quantity of the diads is at least 75% and the quantity of the pentads at least 30%. WO 94/21694 describes a process for producing hydrogenated poly(alkenyl-aromatic) polymers and poly(alkenyl-aromatic)/polydiene block co-polymers. Syndiotactic polystyrene is mentioned in general terms.

Processes which lead to isotactic, syndiotactic and atactic hydrogenated polystyrene which have the material properties known hitherto are described in WO 94/21694, U.S. Pat. No. 5,352,744, wherein specific catalysts are used. Processes for the hydrogenation of atactic polystyrene to produce atactic hydrogenated polystyrene by the use of specific catalysts are described in U.S. Pat. Nos. 5,654,253; 5,612,422; WO 96/34896.

Atactic polymers are regular polymers. By definition they have the possible configurative base units in equal quantities, with ideal-random distribution from molecule to molecule (TUPAC). They are distinguished by the same number of iso-and syndiotactic diads. An amorphous material with only one glass stage with no crystalline content is described.

The present invention provides a polymer or co-polymer based on vinyl cyclohexane, wherein olefins, acrylic acid derivatives, maleic acid derivatives, vinyl ethers or vinyl esters may be used in production as co-monomers, with syndiotactic configuration, characterized in that the quantity of diads is greater than 50.1% and less than 74%. The polymers based on vinyl cyclohexane are amorphous polymers.

The polymers according to the invention are distinguished by, high transparency, low birefringence and high heat deflection temperature and may therefore be used as substrate material for optical data storage media. Because of its crystallinity the known, isotactic PVCH is unsuitable for optical applications.

The invention provides hydrogenated products of polystyrene which lead to an amorphous hydrogenated polystyrene with an excess of the racemic (syndiotactic) diads.

The vinyl cyclohexane polymer of this invention is a new amorphous polymer with a defined stereostructure which is distinguished by the predominant occurrence of the racemic diads configuration and may be efficiently produced by the process described.

A polymer based on vinyl cyclohexane is preferred with the repeating structural unit of formula (I)

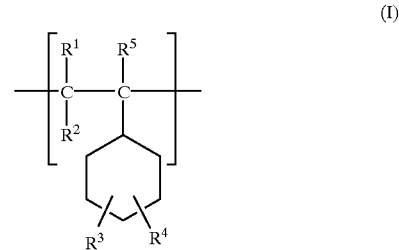

in which
  $R^1$ and $R^2$ independently of each other stand for hydrogen or $C_1$–$C_6$ alkyl, preferably $C_1$–$C_4$ alkyl, and
  $R^3$ and $R^4$ independently of each other stand for hydrogen or for $C_1$–$C_6$ alkyl, preferably $C_1$–$C_4$ alkyl, particularly methyl and/or ethyl, or $R^3$ and $R^4$ jointly stand for alkylene, preferably $C_3$ or $C_4$ alkylene (fused 5 or 6-membered cycloaliphatic ring),
  $R^5$ stands for hydrogen or $C_1$–$C_6$ alkyl, preferably $C_1$–$C_4$ alkyl,
  $R^1$, $R^2$ and $R^5$ independently of each other stand in particular for hydrogen or methyl.

Apart from the stereoregular head-to-tail linkage, the linkage may have a small content of head-to-head linkage. The amorphous, predominantly syndiotactic polymer based on vinyl cyclohexane may be branched via centres and may have a stellar structure for example.

The following may preferably be used in the polymerization of the starting polymer (optionally substituted polystyrene) and be co-incorporated into the polymer as co-monomers: olefins with in general 2 to 10 C atoms, such as for example ethylene, propylene, isoprene, isobutylene, butadiene, $C_1$–$C_8$, preferably $C_1$–$C_4$ alkyl esters of acrylic and/or methacrylic acid, unsaturated cycloaliphatic hydrocarbons, e.g. cyclopentadiene, cyclohexene, cyclohexadiene, optionally substituted norbornene, dicyclopentadiene, dihydrocyclopentadiene, optionally substituted tetracyclododecenes, nucleus-alkylated styrenes, α-methylstyrene, divinyl benzene, vinyl esters, vinyl acids, vinyl ethers, vinyl acetate, vinyl cyanides such as for example acrylonitrile, methacrylonitrile, maleic anhydride and mixtures of these monomers.

The amorphous vinyl cyclohexane polymer according to the invention has a syndiotactic diad content, determined by two-dimensional NMR spectroscopy, of 50.1 to 74%, preferably of 52–70%. Methods for microstructure elucidation using $^{13}C$–$^1H$ correlation spectroscopy of the methylene carbon atoms of a polymer backbone are generally known and are described by A. M. P. Ros and O. Sudmeijer for example (A. M. P. Ros, O. Sudmeijer, Int. J. Polym. Anal. Charakt. (1997) 4, 39).

The signals of crystalline isotactic and syndiotactic polyvinyl cyclohexane are determined by means of two-dimensional NMR spectroscopy. The methylene-carbon atom (in the polymer backbone) of the isotactic polyvinyl cyclohexane splits into two separated proton signals in the 2-D CH correlation spectrum and exhibits the pure isotactic diad configuration. In contrast, for the carbon atom C 1, syndiotactic polyvinyl cyclohexane exhibits only one signal in the 2-D CH correlation spectrum. The amorphous syndiotactically rich polyvinyl cyclohexane according to the invention has an integral intensity excess of the syndiotactic diads compared to the isotactic diad configuration.

The birefringence determined on these materials, measured with the aid of the rheo-optical constant $C_R$, is –0.3 $GPa^{-1}$, which is more than one power of ten lower than that for polycarbonate ($C_R$=+5.4 $GPa^{-1}$). The method for measuring the rheo-optical constant is described in EP-A 0621 297. The plane-parallel 150 to 1000 μm sample bodies required for this may be produced by melt compression moulding or film casting. Compared with polycarbonate the material may be regarded as birefringence-free. It has a high heat deflection temperature, low water absorption, accompanied by adequate mechanical properties, and is therefore an ideal material for very high optical data storage densities (>10 Gbytes on a disc of 120 mm diameter).

In general the vinyl cyclohexane (co)polymers have absolute molecular weights Mw weight average of 1000–10000000, preferably of 60000–1000000, most particularly preferably 70000–600000, determined by light scatter.

In general the homopolymers based on vinyl cyclohexane according to the invention have a glass temperature >140° C., preferably >145° C., determined by DSC.

The co-polymers may be present both randomly and as block co-polymers.

The polymers may have a linear chain structure and also have branch points by co-units (e.g. graft co-polymers). The branch centres contain stellar or branched polymers for example. The polymers according to the invention may have other geometrical shapes of the primary, secondary, tertiary, optionally quaternary polymer structure; helix, double helix, pleated sheet etc. and/or mixtures of these structures may be mentioned.

Block co-polymers contain di-blocks, tri-blocks, multi-blocks and stellar block co-polymers.

The VCH (co)polymers are produced by polymerizing derivatives of styrene with the corresponding monomers radically, anionically, cationically or by metal complex initiators and/or catalysts and then partially or completely hydrogenating the unsaturated aromatic bonds (cf WO94/21694, EP A 322 731 for example). They are distinguished by the predominant occurrence of the syndiotactic configuration of the vinyl cyclohexane units of the present invention.

The VCH (co)polymers may be further produced, for example, by hydrogenation of aromatic polystyrenes and/or their derivatives in the presence of a catalyst, wherein an ether which has no α-hydrogen atom on a carbon atom adjacent to the ether function, or a mixture of such ethers or a mixture of at least one of the said ethers with solvents suitable for hydrogenation reactions is used as solvent.

The reaction is generally conducted at volume concentrations of the ether component with respect to the entire solvent of 0.1% to 100%, preferably 1% to 60%, most particularly preferably 5% to 50%. The ether component may be designated as a co-catalyst.

In general the process leads to a virtually complete hydrogenation of the aromatic units. Usually the degree of hydrogenation is ≧80%, preferably ≧90%, most particularly preferably ≧99%, particularly 99.5 to 100%. The degree of hydrogenation may be determined by NMR or UV spectroscopy for example.

The starting polymers are generally known (WO 94/21 694 for example).

Ethers of formula (I):

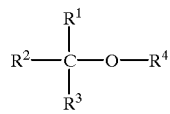

(I)

in which
R$^1$, R$^2$, R$^3$ and R$^4$ independently of each other stand for
$C_1$–$C_8$ alkyl, which is straight-chain or branched, or for
$C_5$–$C_6$ cycloalkyl optionally substituted by $C_1$–$C_4$ alkyl
or
two of the groups R$^1$, R$^2$, R$^3$ and R$^4$ form a ring with 3 to 8, preferably 5 or 6 carbon atoms,
are preferably used as solvent.

Methyl-t-butyl ether, ethyl-t-butyl ether, propyl-t-butyl ether, butyl-t-butyl ether, methyl-(2-methyl-2-butyl)ether, (tert. amyl-methyl ether), 2-ethoxy-2-methylbutane (ethyl-tert.-amyl ether) are particularly preferred.

The quantity of catalyst used depends on the process conducted; this may be continuous, semi-continuous or discontinuous.

The ratio of catalyst to polymer is generally 0.3–0.001, preferably 0.2–0.005, particularly preferably 0.15–0.01, for example, in the discontinuous process.

The polymer concentrations, related to the overall weight of solvent and polymer, are generally 80 to 1, preferably 50 to 10, particularly 40 to 15 wt. %.

The starting polymers are hydrogenated according to generally known methods (WO 94/21 694, WO 96/34 895, EP-A-322 731 for example). A plurality of known hydrogenation catalysts may be used as catalysts. Preferred metal catalysts are quoted in WO 94/21 694 or WO 96/34 896 for example. Any catalyst known, for hydrogenation reactions may be used as catalyst. Suitable catalysts are ones with a large surface (such as 100–600 m²/g) and small average pore diameter (20–500Å for example). Catalysts with a small surface (such as ≧10 m²/g) and large average pore diameters, which are characterized in that 98% of the pore volume have pores with pore diameters greater than 600Å (approx. 1000–4000Å for example) (cf. U.S. Pat. Nos. 5,654,253, 5,612,422, JP-A 03076706 for example) are also suitable. Raney nickel, nickel on silicon dioxide or silicon dioxide/aluminium oxide, nickel on carbon as carrier and/or precious metal catalysts such as Pt, Ru, Rh, Pd are used in particular.

The reaction is generally carried out at temperatures between 0 and 500° C., preferably between 20 and 250° C., particularly between 60 and 200° C.

The solvents which may conventionally be used for hydrogenation reactions are described in DE-AS 1 131 885 for example (see above).

The reaction is generally carried out at pressures of 1 bar to 1000 bar, preferably 20 to 300 bar, particularly 40 to 200 bar.

The polymers or copolymers based on vinyl cyclohexane according to the invention are outstandingly suitable for producing optical data storage media, preferably with data storage densities >5, particularly >10 Gbytes, related to a disc of 120 mm diameter.

The following may be quoted as examples of optical data storage media:

Magneto-optic disc (MO-disc)
Mini-disc (MD)
ASMO (MO-7) ("Advanced storage magnetooptic")
DVR (12 Gbyte Disc)
MAMMOS ("Magnetic Amplifying magneto optical system")
SIL and MSR ("Solid immersion lens" and "magnetic superresolution")
CD-ROM (Read only memory)
CD, CD-R (recordable), CD-RW (rewritable), CD-I (interactive), Photo-CD
Super Audio CD
DVD, DVD-R (recordable), DVD-RAM (random access memory); DVD 32 digital versatile disc
DVD-RW (rewritable)
PC+RW (Phase change and rewritable)
MMVF (multimedia video file system)

Because of their outstanding optical properties the polymers according to the invention are also particularly suitable for producing optical materials, e.g. for lenses, prisms, mirrors, colour filters etc. Also as media for holographic reproductions (e.g. cheque, credit cards, identity cards, three-dimensional holographic images). The materials may be used as transparent media for inputting three-dimensional structures, for example comprising focussed coherent radiation (LASER) particularly as three-dimensional data storage media or for the three-dimensional representation of objects.

The material may conventionally be used in place of or in conjunction with glass up to service temperatures of 145° C. Exterior applications for the transparent materials are roofing, window panes, films, glazing of glasshouses, in the form of twin-wall sheets for example. Further applications are covers to protect mechanically sensitive systems with high transparency at the same time, e.g. in the photovoltaics field, particularly solar cells or solar collectors. The plastics according to the invention may be coated with other materials, particularly with nanoparticles to increase scratch resistance, metals and other polymers.

Examples of domestic applications are transparent packing materials with low water permeability, household articles produced by extrusion or injection moulding, e.g. pots and containers. Also domestic appliances and transparent lampshades.

As temperature-resistant rigid foams the plastics may be used for insulation in the building and technology field (house and appliance insulation, for refrigerators for example) and replace polystyrene and polyurethane foam for example. The high long-term service temperature is an advantage.

Because of the low density (d<1) and weight-saving which results therefrom the materials are particularly suitable for applications in the motor vehicle, aviation and aerospace industry for instrument panels, transparent covers of instrument systems and of light sources, on-board glazing and insulating material.

The materials are insulators for electric current and are therefore suitable for producing capacitors (e.g. dielectrics), electronic circuits and equipment housings. Further applications in the electrical industry are based in particular on the combination of high optical transparency with high heat deflection temperature, low water absorption in conjunction with light from suitable emitting sources. The materials are therefore suitable for producing light-emitting diodes, laser diodes, matrices for organic, inorganic and polymeric electroluminescent materials, opto-electrical signal receiving equipment, data transmission systems by replacing glass fibre (e.g. polymer optical fibres), transparent materials for electronic display media (screens, displays, projection equipment) e.g. of liquid crystal substrates.

The materials are suitable for applications in medical technology for transparent extruded or injection moulded articles for sterile and non-sterile analytical vessels, Petri dishes, microfilter plates, microscope slides, hoses, breathing tubes, contact lenses, spectacle lenses and containers of infusion solutions or drug solutions for example, extruded and injection moulded articles for applications in contact with blood, particularly for producing syringes, cannulas, catheters, short and long-term implants (e.g. artificial lenses), flexible tubes for blood, membranes for blood detoxification, dialyzers, oxygenators, transparent plasters, stored blood containers and suture materials.

EXAMPLES

Example 1

The autoclave is flushed with inert gas (argon). The polymer solution and the catalyst are added (Table 1). After closure, protective gas is applied several times and then hydrogen. After release the particular hydrogen pressure is set and heating to the corresponding reaction temperature takes place accompanied by stirring. The reaction pressure is kept constant after hydrogen absorption has begun.

When the reaction has ended the polymer solution is filtered. The product is precipitated in methanol and dried at 120° C. The isolated product has the physical properties listed in Table 2.

Comparative Example A

Syndiotactic polyvinyl cyclohexane

A fully heated 250 ml three-necked flask under argon, with reflux condenser, is filled in sequence with 50 ml of abs. toluene, 20 ml of methyl aluminoxane (10% solution in toluene), 16.5 mg (0.075 mmole) of titanium cyclopentadienyl trichloride and 10.4 g (0.1 mole) of styrene. The reaction mixture is heated to 50° C. and maintained at this temperature for 2 hours. The reaction is terminated by the addition of acidic methanol. The polymer is washed with 200 ml of methanol several times and dried at 80° C.

12.5 g of palladium on barium sulfate are reduced with hydrogen and inertized with inert gas. A 1 L pressure reactor is flushed with inert gas. 2.5 g of syndiotactic polystyrene dissolved in cyclohexane and the catalyst are added to the autoclave (Table 1). The hydrogen pressure is set to 50 bar and the batch heated to 200° C. After 24 hours the reaction is terminated, relieved and the polymer solution is filtered. The filtrate is precipitated in methanol and dried in vacuo at 120° C. The isolated product has the physical properties listed in Table 2.

Comparative Example B

Isotactic polyvinyl cyclohexane 100 ml of abs. toluene, 12.5 g (0.11 mole) of vinyl cyclohexane and 5 mmole of triethyl aluminium are transferred into a fully heated 1 L three-necked flask filled with inert gas, with reflux condenser, at room temperature.

1 ml of triethyl aluminium (1M) and 2 ml of titanium(IV) chloride (1M) in 12.5 ml of toluene are stirred for 30 minutes at 80° C. and added to the monomer solution.

The reaction mixture is heated to 60° C., stirred for 50 minutes at this temperature and then maintained at 85° C. for 90 minutes. Polymerization is terminated by addition of methanol. The product is refluxed in methanol, filtered off and then washed with methanol and acetone. The polymer is dried at 60° C. in vacuo. The product has the physical properties listed in Table 2.

Comparative Example C

Polycarbonate comprising 2,2-bis(4-hydroxyphenyl) propane

A 150 μm thick film of polycarbonate based on 2,2-bis (4-hydroxyphenyl)propane (Makrolon CD 2005, Bayer AG) is produced by melt compression moulding. A glass temperature of 142° C. and a rheo-optical constant of +5.4 GPa$^{-1}$ is measured on this film (cf. Table 2).

TABLE 1

Hydrogenation of polystyrene of different tacticity

| Example No. | Polymer mass g | Solvent ml | Catalyst mass g | Reaction temp. ° C. | Hydrogen Pressure bars | Reaction time hours | Degree of hydrogenation[1] % |
|---|---|---|---|---|---|---|---|
| 1 | 25.9[2] | 300 ml cyclohexane | 12.5[3] | 200 | 50 | 6 | 100 |
| A | 2.5 | 300 ml cyclohexane | 12.5[4] | 200 | 85 | 24 | 100 |

[1]Determined by $^1$H-NMR spectroscopy
[2]Polystyrene, type 158 k glass-clear, Mw = 280000 g/mole, BASF AG, Ludwigshafen, Germany
[3]Ni/SiO$_2$/Al$_2$O$_3$, 64–67% nickel, Aldrich
[4]5% palladium on barium sulfate, Aldrich.

TABLE 2

Thermal and optical properties of the various vinyl cyclohexane homopolymers

| Example No. | Isotact. diads[3] % | Syndiotact. diads[3] % | Glass temp. Tg ° C. | Melting point Tm ° C. | Rheo-optical constant CR GPa$^{-1}$ |
|---|---|---|---|---|---|
| 1 | 41 | 59 | 145 | — | −0.3 |
| A | <2 | >98 | 126 | 295 | —[2] |
| B | >98 | <2% | —[1] | 369 | —[2] |
| C | — | — | 142 | — | +5.4 |

[1]Not detected by DSC measurements
[2]Rheo-optical constant C$_R$ cannot be determined as the samples are crystalline.
[3]Determined by two-dimensional nuclear magnetic resonance spectroscopy (2D-NMR).

The amorphous polyvinyl cyclohexane according to the invention (Example 1) is distinguished by the predominant occurrence of syndiotactic diads. Compared with polycarbonate the material has a rheo-optical constant C$_R$ which is much lower as far as the value is concerned, with similarly high heat deflection temperature (glass temperature). It is therefore particularly suitable for high optical data storage densities. Because of their crystallinity and low transparency the syndiotactic and isotactic materials described above are unsuitable for optical applications.

What is claimed is:
1. An amorphous polymer comprising:
   (a) at least one residue of a monomer selected from at least one of vinyl cyclohexane and substituted vinyl cyclohexane; and
   (b) optionally at least one residue of a monomer selected from at least one of olefins, alkyl esters of acrylic acid or methacrylic acid, cyclopentadiene, cyclohexene, cyclohexadiene, optionally substituted norbornene, dicyclo-pentadiene, dihydrocyclopentadiene, optionally substituted tetracyclododec-enes, nucleus-alkylated styrenes, α-methylstyrene, divinyl benzene, vinyl esters, vinyl acids, vinyl ethers, vinyl acetate, acrylonitrile, methacrylo-nitrile and maleic anhydride,
wherein said polymer is amorphous and has a syndiotactic configuration, characterized in that the quantity of diads is greater than 50.1% and less than 74%.
2. The polymer of claim 1, wherein the quantity of diads is 52 to 70%.
3. The polymer of claim 1, wherein said polymer has a repeating structural unit represented by the following formula (I),

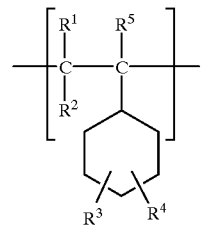

(I)

in which
R$^3$ and R$^4$ independently of each other are selected from hydrogen, and C$_1$–C$_6$ alkyl, or R$^3$ and R$^4$ jointly stand for alkylene, and
R$^1$, R$^2$ and R$^5$ independently of each other stand for hydrogen or C$_1$–C$_6$ alkyl.

4. Optical data storage media prepared from the polymer of claim 1.

5. Moulded bodies and films prepared from the polymer of claim 1.

6. An amorphous copolymer comprising:
   (a) at least one residue of a monomer selected from at least one of vinyl cyclohexane and substituted vinyl cyclohexane; and
   (b) at least one residue of a monomer selected from at least one of olefin, alkyl ester of acrylic acid, alkyl ester of methacrylic acid, cyclopentadiene, cyclohexene, cyclohexadiene, norbornene, dicyclopentadiene, dihydrocyclopendtadiene, tetracyclododecene, nucleus-alkylated styrene, α-methylstyrene, divinyl benzene, vinyl ester, vinyl acid, vinyl ether, vinyl acetate, acrylonitrile, methacrylonitrile and maleic anhydride, wherein said co-polymer is amorphous and has a syndiotactic configuration characterized in that the quantity of diads is greater than 50.1% and lower than 74%.

7. An amorphous homopolymer consisting essentially of monomer residues selected from vinyl cyclohexane and substituted vinyl cyclohexane, wherein said homopolymer is amorphous and has a syndiotactic configuration characterized in that the quantity of diads is greater than 50.1% and lower than 74%.

8. The polymer of claim 1, wherein said polymer has chain structure selected from linear chain structure, branched chain structure, stellar chain structure and combinations thereof.

9. The polymer of claim 8, wherein said polymer has linear chain structure.

10. A copolymer consisting essentially of first monomer residues selected from at least one of vinyl cyclohexane and substituted vinyl cyclohexane, and second monomer residues selected from at least one of isoprene and butadiene, wherein said copolymer is amorphous and has a syndiotactic configuration characterized in that the quantity of diads is greater than 50.1% and lower than 74%.

* * * * *

UNITED STATES PATENT AND TRADEMARK OFFICE
CERTIFICATE OF CORRECTION

PATENT NO. : 6,365,694 B1
DATED : April 2, 2002
INVENTOR(S) : Volker Wege et al.

It is certified that error appears in the above-identified patent and that said Letters Patent is hereby corrected as shown below:

<u>Title page,</u>
Item [73], Assignee, replace "Bayer Aktiengesellschaft, Leverkusen (DE)" with
-- Bayer Aktiengesellschaft, Leverkusen (DE) and Teijin Ltd., Osaka (JP) --.

Signed and Sealed this

Eleventh Day of February, 2003

JAMES E. ROGAN
*Director of the United States Patent and Trademark Office*